(12) United States Patent
Schultz et al.

(10) Patent No.: US 11,520,045 B2
(45) Date of Patent: Dec. 6, 2022

(54) METHOD AND DEVICE FOR DETECTING OBJECTS, AND LIDAR SYSTEM

(71) Applicant: Robert Bosch GmbH, Stuttgart (DE)

(72) Inventors: Ingmar Schultz, Korntal-Muenchingen (DE); Reiner Schnitzer, Reutlingen (DE); Remigius Has, Grafenau-Daetzingen (DE); Stefan Spiessberger, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 529 days.

(21) Appl. No.: 16/613,882

(22) PCT Filed: May 16, 2018

(86) PCT No.: PCT/EP2018/062639
§ 371 (c)(1),
(2) Date: Nov. 15, 2019

(87) PCT Pub. No.: WO2018/215250
PCT Pub. Date: Nov. 29, 2018

(65) Prior Publication Data
US 2020/0142061 A1 May 7, 2020

(30) Foreign Application Priority Data
May 23, 2017 (DE) .......................... 102017208700.5

(51) Int. Cl.
*G01C 3/08* (2006.01)
*G01S 17/04* (2020.01)
(Continued)

(52) U.S. Cl.
CPC ............ *G01S 17/04* (2020.01); *G01S 7/4817* (2013.01); *G01S 17/42* (2013.01)

(58) Field of Classification Search
CPC ......... G01S 17/04; G01S 7/4817; G01S 17/42
See application file for complete search history.

(56) References Cited

U.S. PATENT DOCUMENTS 10,398,006 B2 * 8/2019 Nakamura .............. G01S 17/42
2014/0111812 A1 4/2014 Baeg et al.
(Continued)

FOREIGN PATENT DOCUMENTS

| DE | 102013111547 A1 | 4/2015 |
| EP | 3118651 A1 | 1/2017 |
| WO | 2012010839 A1 | 1/2012 |

OTHER PUBLICATIONS

International Search Report for PCT/EP2018/062639, dated Aug. 22, 2018.

*Primary Examiner* — Adam M Alharbi
(74) *Attorney, Agent, or Firm* — Norton Rose Fulbright US LLP; Gerard Messina

(57) ABSTRACT

A method for detecting objects using a LIDAR system. The method includes emitting a first light beam scanning in a scanning direction in an emission direction at a first instant, allocating a first propagation time between the first transmission instant and a first receiving instant of a first reflection of the first light beam to the emission direction, emitting in the emission direction, an angle-resolved, further light beam scanning in the scanning direction and angularly offset from the first light beam, at a second transmission instant following the first emission instant, allocating a second propagation time between the second transmission instant and a second receiving instant of a second reflection of the second light beam to the emission direction, and evaluating hits using the propagation times allocated to the emission direction.

13 Claims, 3 Drawing Sheets

(51) Int. Cl.
*G01S 7/481* (2006.01)
*G01S 17/42* (2006.01)

(56) References Cited

U.S. PATENT DOCUMENTS

2016/0282468 A1     9/2016  Gruver et al.
2018/0136321 A1*    5/2018  Verghese ................ G01S 17/42
2019/0250250 A1*    8/2019  Hayashi ................ G01S 7/4808

* cited by examiner

METHOD AND DEVICE FOR DETECTING OBJECTS, AND LIDAR SYSTEM

FIELD

The present invention relates to a method and a device for detecting objects and to a LIDAR system.

BACKGROUND INFORMATION

In a LIDAR system, light is transmitted into a detection range and a distance to an object at which the reflection has taken place is ascertained based on a time period until a reflection of the light is detected. Since the light is transmitted in a directed manner, a direction to the object is known as well. The light is supplied in the form of a scanning light beam, which scans a detection range of the LIDAR sensor at an angular velocity.

SUMMARY

In accordance with the present invention, an example method for detecting objects using a LIDAR system, a corresponding device as well as an example LIDAR system are provided. Advantageous further developments and improvements of the presented approach are described herein.

Specific example embodiments of the present invention may advantageously make it possible to sequentially illuminate an object multiple times within a short time period and to obtain a plurality of distance values in this manner. The distance values are able to be averaged in an effort to improve a detection accuracy.

In accordance with the present invention, an example method is introduced for detecting objects using a LIDAR system, the method including a step of transmitting, a first light beam scanning in a scanning direction is emitted in an emission direction at a first transmission instant; and in a step of allocating, a first propagation time between the first transmission instant and a first receiving instant of a first reflection of the first light beam is allocated to the emission direction; and in the step of transmitting, a further light beam scanning in the scanning direction and angularly offset from the first light beam is transmitted in the emission direction at a second transmission instant following the first transmission instant; and in the step of allocating, a second propagation time between the second transmission instant and a second receiving instant of a second reflection of the second light beam is allocated to the emission direction; and in a step of evaluating, hits are evaluated using the propagation times allocated to the emission direction, i.e. especially the mentioned first and second propagation times.

In addition, in accordance with the present invention, an example device is provided, which is configured to carry out, implement and/or actuate the method according to the introduced approach in corresponding devices.

Furthermore, in accordance with the present invention, an example LIDAR system is provided, which has a device according to the present invention.

Features and improvements in connection with specific embodiments of the present invention may be considered to be based, among other things, on the thoughts and recognitions described below.

In a LIDAR system, a light beam is emitted in an emission direction or under an emission angle. The light beam is emitted in the form of successive light pulses and is swept or scanned across a detection range in a scanning direction at an angular velocity. When the light beam impinges upon an object in a hit, the light of the light beam is dispersed. A small portion of the dispersed light is reflected in a direction counter to the emission direction. If the object is retroreflective, then the light in a hit is dispersed to a lesser degree and a larger portion of the light is reflected in the opposite direction. The returned light is guided onto a sensor in the LIDAR system. The sensor supplies an electrical pulse when more than a design-specific quantity of light is incident on the sensor. The pulse thus marks a candidate for a hit. The sensor may be so sensitive that a single photon will trigger the pulse. In view of such a high sensitivity, the signal of the sensor includes noise because pulses are triggered also in the absence of hits, i.e. when ambient light falls on the sensor.

In accordance with the present invention, a plurality of light beams emitted in the scanning direction and slightly divergent in their beam direction is swept across the detection range in the scanning direction in order to illuminate the same point multiple times within a short period of time or to emit a light beam in the same emission direction. The light beams are angularly offset from one another. In the ideal case, each hit on an object generates a detectable reflection. When multiple propagation times are successively allocated to an emission direction within a tolerance range, then it is likely that hits on an object or reflections at the object have actually resulted in the pulses at the sensor.

The steps of transmitting and allocating are able to be repeated for further emission directions at additional transmission instants. The steps may be repeated across the entire detection range. Because of the sweeping or scanning of the plurality of light beams, multiple emission directions are always illuminated simultaneously. Each emission direction is illuminated multiple times in succession.

A receiving device which is situated laterally next to a transmission device of the LIDAR system is able to receive the reflections. The LIDAR system may have a biaxial development. The first light beam is then able to be transmitted parallel to a receiving axis, i.e., in the direction of infinity. Additional light beams may intersect the receiving axis inside the detection range. In this way each light beam can be allocated to a distance range. Objects within this distance range are able to be detected in an especially satisfactory manner with the aid of the respectively allocated light beam. A compensation for the parallax effect resulting from the biaxial system is thereby able to take place at the sensor.

The first reflection may be received in a first receiving range of a receiving device allocated to the first light beam. The second reflection may be received in a second receiving range of the receiving device allocated to the second light beam. The first receiving range and the second receiving range may have a lateral offset in the scanning direction. The first receiving range is able to receive reflections from the first emission direction. The second receiving range is simultaneously able to receive reflections from a second emission direction that is angularly offset from the first emission direction.

The light beams, i.e. in particular the first and the second light beams, are able to be transmitted at an angular offset from each other of between zero degrees and five degrees. Such an acute angle makes it possible to ensure a short time interval between the scannings of the same emission direction.

In the step of transmitting, the light beams may be transmitted with different intensities. Optical properties of an illuminated object are able to be inferred on the basis of different intensities. For example, only retroreflecting objects will still be detectable starting with an intensity threshold and/or a distance threshold. Conversely, at low intensities, a higher detection accuracy is achieved for retroreflecting objects in the near range.

Laser beams may be emitted as light beams. Laser beams are able to be formed extremely well so that it is possible to achieve a large range.

The light beams are able to be transmitted in fanned-out form across an angular range that is aligned transversely to the scanning direction. The reflections may be received in an angle-resolved manner across the angular range. The light beams may have a linear development. The line may sweep the angular range, and objects within the angular range are detectable. If the scanning direction has an essentially horizontal alignment, the lines may have an essentially vertical alignment.

It should be pointed out that a few of the possible features and advantages of the present invention have been described here with reference to different specific embodiments. One skilled in the art will understand that the features of the present method, the device and the LIDAR system are able to be suitably combined, adapted or exchanged in order to obtain further specific embodiments of the present invention.

BRIEF DESCRIPTION OF THE DRAWINGS

Below, specific embodiments of the present invention are described with reference to the figures but neither the figures nor the description should be considered as limiting the present invention.

The figures are merely schematic and have not been drawn true to scale. Identical reference numerals in the figures denote identical or identically acting features.

DETAILED DESCRIPTION OF EXAMPLE EMBODIMENTS

Figure 1:
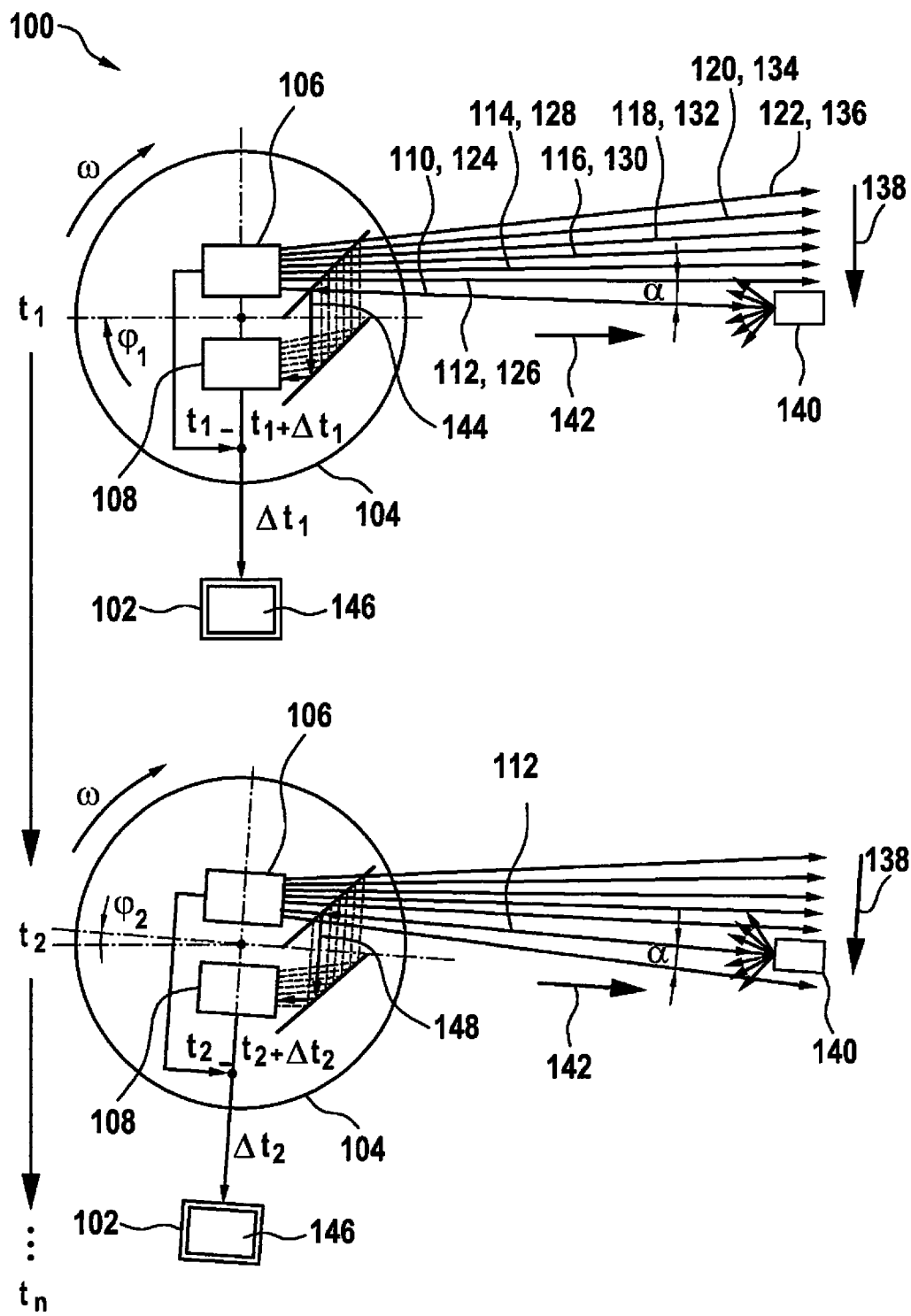
FIG. 1 shows a block diagram of a LIDAR system having a device according to an exemplary embodiment.

FIG. 1 shows a block diagram of a LIDAR system 100 having a device 102 according to an exemplary embodiment of the present invention. LIDAR system 100 has a rotor 104, which rotates about an axis of rotation at an angular velocity ω. A transmission device 106 and a receiving device 108 of LIDAR system 100 are situated on rotor 104. LIDAR system 100 is developed as a coaxial system. In each angular position φ of rotor 104, transmission device 106 transmits a multitude of light beams 110, 112, 114, 116, 118, 120, 122 divergent by angle of divergence α into a multitude of angles 124, 126, 128, 130, 132, 134, 136. Light beams 110, 112, 114, 116, 118, 120, 122 may be laser beams, for instance. Because of angular velocity ω, light beams 110, 112, 114, 116, 118, 120, 122 move in a scanning direction 138. LIDAR system 100 depicted here is developed to detect a detection range of 360 degrees. In the process, light beams 110, 112, 114, 116, 118, 120, 122 scan the entire detection range once per rotation of rotor 104. Due to the many light beams 110, 112, 114, 116, 118, 120, 122, each angle of the detection range is scanned one after the other many times in rapid succession. In the process, a multitude of angles or a circle sector of the detection range is simultaneously illuminated.

In this instance, an object 140 is situated in the detection range. A direction to object 140 is denoted as emission direction 142. At a first transmission instant t1, first light beam 110 is transmitted in emission direction 142 and impinges upon object 140. Light beam 110 is dispersed at object 140. A small portion of the light of first light beam 110 is returned as a first reflection 144 counter to emission direction 142 under angle 124. Receiving device 108 registers at least one first receiving instant t1+Δt1 of first reflection 144 as a hit.

A first propagation time Δt1 results from first transmission instant t1 and first receiving instant t1+Δt1. A device 146 for allocating of device 102 allocates first propagation time Δt1 to first emission direction 142.

At a second transmission instant t2, rotor 104 has continued rotating by angle of divergence α. Second light beam 112 is now transmitted in emission direction 142. Object 140 is still located in emission direction 142. Second light beam 112 impinges upon object 140, is dispersed at object 140, and a small portion of the light of second light beam 112 is reflected counter to emission direction 142 at second angle 126 as a second reflection 148. Receiving device 108 registers at least one second receiving instant t2+Δt2 of second reflection 148 as a further hit.

A second propagation time Δt2 results from second transmission instant t2 and second receiving instant t2+Δt2. Second propagation time Δt2 is also allocated to first emission direction 142 by device 146 for allocating.

Since angle of divergence α lies between one and three degrees, light beams 110, 112, 114, 116, 118, 120, 122 impinge upon object 140 in such quick succession that a relative movement between object 140 and LIDAR system 100 leads only to a very slight change in propagation times Δt1, Δt2. Object 140 is thus detected in a quasi-static manner.

This sequence is repeated until last light beam 122 is emitted in first emission direction 142 at a transmission instant tn and last receiving instant tn+Δtn of the last reflection is registered. Last propagation time Δtn is also allocated to emission direction 142.

In one exemplary embodiment, an average value is formed across propagation times Δt1, Δt2 to Δtn in order to detect outliers of the hits. The outliers may be caused by randomly triggered pulses at a detector of receiving device 108, for instance. A hit or a receiving instant is mistakenly detected in the process despite the fact that no reflection has yet arrived or no reflection has arrived at all. The average value formation ensures the reliability of the object detection.

Since light beams 110, 112, 114, 116, 118, 120, 122 are simultaneously transmitted in a multitude of emission directions, the approach presented here is simultaneously also carried out for the other emission directions for as long as light beams 110, 112, 114, 116, 118, 120, 122 are emitted in these emission directions. The allocation process begins when first light beam 110 is transmitted in the respective emission direction. The allocation process concludes when last light beam 122 has been transmitted in the emission direction.

In other words, a simultaneous emission and evaluation of closely adjacent laser lines of a scanning LIDAR system 100 is carried out in the approach introduced here.

In a scanning LIDAR system, a laser beam is emitted into different emission angles and received again. Based on these angle-dependent individual measurements, an environment image may in turn be derived. The required beam deflection is able to be realized through a suitable optics system, e.g., a movable mirror or a rotating system of all components.

Alternatively, a local resolution is able to be realized by the simultaneous or sequential illumination of a larger region, e.g., a line, and a receiving-side differentiation with the aid of an imaging optics system and a detector array or a detector line.

A scanning system may be combined with a flash approach. Particularly advantageous is the emission of a line in combination with a rotating system. The line is then subdivided into individual pixels with the aid of an imaging optics system and a resolving detector line.

Single-photon diodes SPAD or avalanche photodiodes APD may be used as detectors.

The performance, i.e., the signal-to-noise ratio, of SPAD detectors is able to be improved by the evaluation of many individual measurements via a statistic, which may be referred to as a concurrence detection. However, even systems that use APDs may be improved by the evaluation of a plurality of measurements.

At usual frame rates of below 40 Hz of LIDAR systems, however, these multiple measurements are unable to be correlated in a meaningful way across two frames or single images because objects execute an excessively large relative movement in the time between two frames as a result of a movement of the LIDAR system and/or of the objects. Because of the relative movement, the reflections at an object 140 during this time are already imaged on different pixels.

In accordance with the present invention, multiple measurements of an object are carried out at short time intervals within a frame.

In order to allow for a better classification of different targets, not only the pure distance measurement but also data relating to the received signal strength are advantageous. However, this causes the demands on the dynamic range of the detectors to become very high since objects that are low-reflective and situated at a great distance supply much less of a signal than highly reflective targets close by.

In accordance with the present invention, the number of achievable measurements per emission angle per frame is able to be increased at an unchanged rotational frequency of a scanning system 100 with the result that the signal-to-noise ratio may be improved. As an alternative, the rotational frequency may be increased for a higher frame rate. A higher rotational frequency may be advantageous for the smooth running characteristics of the engine.

Figure 2:
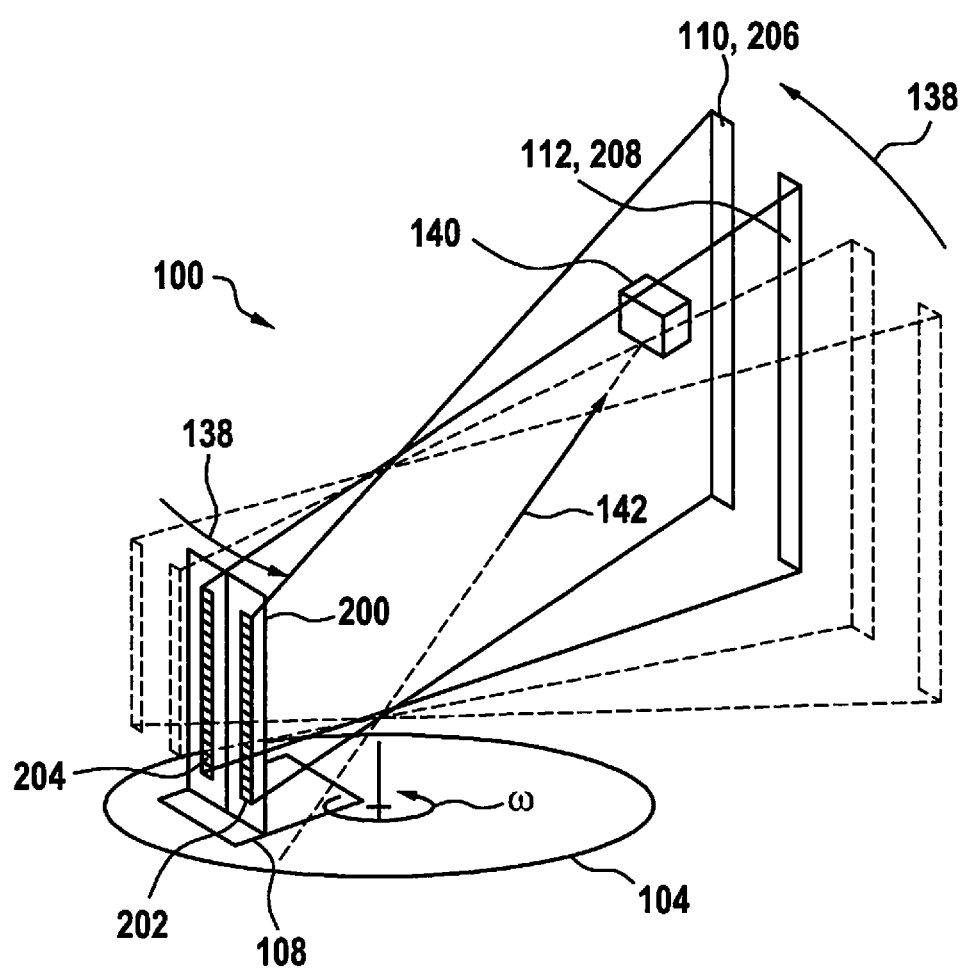
FIG. 2 shows an illustration of light beams of a LIDAR system according to an exemplary embodiment.

FIG. 2 shows an illustration of light beams 110, 112 of a LIDAR system 100 according to an exemplary embodiment. LIDAR system 100 essentially corresponds to the LIDAR system of FIG. 1. Only rotor 104 and receiving device 108 of LIDAR system 100 are shown in this instance. To simplify matters, the transmission device (not shown) of LIDAR system 100 transmits only two divergent light beams 110, 112. Only one detector 200 of receiving device 108 is depicted. Detector 200 has a first receiving range 202 and a second receiving range 204. First receiving range 202 is allocated to first light beam 110. Second receiving range 204 is allocated to second light beam 112. Areas 206, 208 illuminated by light beams 110, 112 are shown. Receiving ranges 202, 204 and areas 206, 208 are disposed at a lateral offset from each other in scanning direction 138. Both receiving ranges 202, 204 and both areas 206, 208 are linear and aligned transversely to scanning direction 138. Receiving ranges 202, 204 have at least one line of sensor elements which are situated next to one another in each case, transversely to scanning direction 138. The sensor elements resolve areas 206, 208 into individual angular ranges.

The sensor elements are avalanche photodiodes, for example, which may be sensitive enough to supply an electrical pulse when a single photon impinges upon them. Avalanche photodiodes are also able to be operated in a linear operating mode. An intensity of the incident light is then able to be imaged in a supplied electrical signal.

In this instance, object 140 is shown in front of light beams 110, 112 in scanning direction 138. As a result, light beams 110, 112 do not yet illuminate object 140. Because of the rotary movement at angular velocity ω, first light beam 110 will illuminate object 140 once first light beam 110 is aligned in emission direction 142. First receiving range 202 is then also situated in emission direction 142 and the first reflection at object 140 is detected on the sensor elements of first receiving range 202 resolving the corresponding angular range of first area 206, and is allocated as a first hit to emission direction 142.

Rotor 104 continues to rotate the transmission device and receiving device 108. When second light beam 112 is aligned in emission direction 142, then second receiving range 204 will also be located in emission direction 142. The second reflection at object 140 is detected on the sensor elements of second receiving range 204 resolving the corresponding angular range of second area 208, and is allocated as a second hit to emission direction 142.

In one exemplary embodiment, first light beam 110 and second light beam 112 have different intensities. For instance, the intensity of first light beam 110 is greater than the intensity of second light beam 112. Because of the different intensities, reflections of different magnitudes take place at the same object 140. If object 140 is retroreflective, for example, then much light is reflected in the direction from which the light arrived. This light quantity may overload the sensor elements. For example, blooming may occur so that even unexposed sensor elements emit an electrical signal and object 140 is therefore no longer able to be resolved. Light beam 112 which has the lower intensity will also be reflected at the lower intensity. The sensor elements are able to resolve the lower light quantity again.

In the same way, the light intensity of a reflection at a close object is greater than the reflection at the same object at a greater distance. In the case of close objects, the high light intensity of first light beam 110 may lead to a high intensity of the first reflection. The close objects are able to be resolved because of the lower light intensity of second light beam 112.

Since lines 206, 208 of different intensities are used, a saturation of the receiver in the case of high intensity signals is able to be prevented so that intensity values are able to be ascertained even if the receive signals are strong.

In the approach presented here, multiple laser lines are emitted and evaluated at the same time. The laser lines may have different intensities. The lines sequentially scan identical regions with a short time interval. More individual measurements per emission angle during a single revolution are therefore available for averaging.

In addition, the lines may have different intensities in order to allow for an ascertainment of intensity values of the reflected signal with a high dynamic range.

In this instance, a parallel emission and detection of a plurality of laser lines takes place, the spacing of the laser lines being less than three degrees, which corresponds to a spacing on the sensor of fewer than 20 pixels. The individual lines may have different intensities. In biaxial systems, the parallax effect is able to be reduced.

The example embodiment of the present invention is based on the emission of a plurality of laser lines of a scanning LIDAR system. Scanning movement 138 may be realized by a rotation of complete LIDAR system 100 made up of the laser and/or detector, or else by a beam deflection via an optical element. The lines cycle through identical regions with an offset in time. While cycling through the first line, the information is buffer-stored and offset against the information of the second line as soon as this information becomes available. The laser lines lie on the sensor with a separation of only a few pixels (<20) so that movements of the ego vehicle or else also movements of the environment do not affect the resolution of the system to any significant extent. Greater distances between cycles cause smearing of multiple measurements. In the approach introduced here, the number of the achievable measuring points per emission angle is able to be increased at an unchanged rotational frequency ω. Alternatively or additionally, the rotational frequency may be increased. In order to achieve the same number of measuring points per emission angle as with two laser lines, rotational frequency ω is able to be doubled.

The laser lines may have different intensities. For example, the intensity of the first laser line may be greater than the intensity of the second laser line. In the case of the laser line having the low intensity, a saturation of the receiver in the presence of retroreflecting objects is able to be prevented. This is advantageous in particular if a statement about the intensity of the received reflection is to be provided in addition to the pure distance measurement.

Technologically, the emission of a plurality of closely adjacent laser lines is easily implementable by stacking laser chips and subsequent near-field imaging. A power variation of the individual laser sources may be realized in different manners, e.g., by varying the number of emitters. At least two detector lines featuring a parallel evaluation are used on the detector side. In the ideal case, a detector array is used.

It is also possible to duplicate patterns that deviate from a line and to analyze them based on the above-described procedure.

Figure 3:
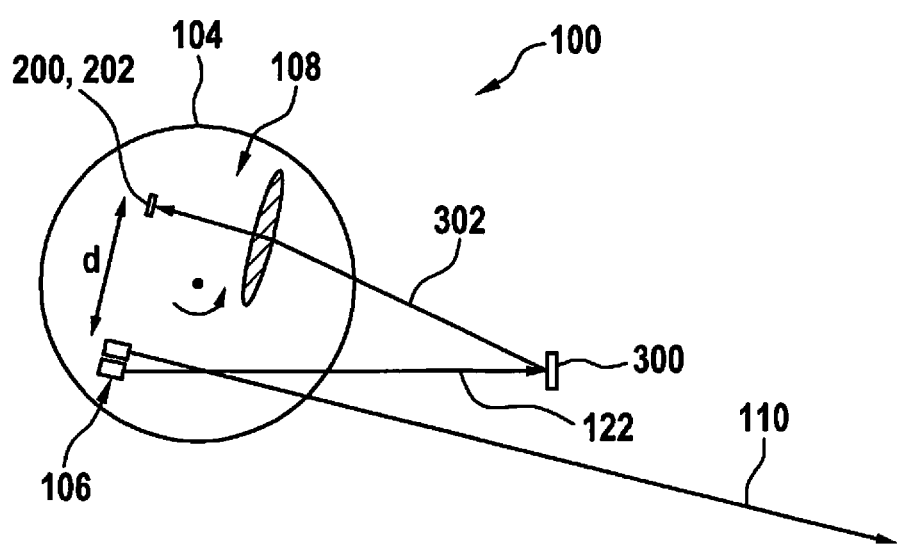
FIG. 3 shows an illustration of a LIDAR system according to one exemplary embodiment.

FIG. 3 shows an illustration of a LIDAR system 100 according to an exemplary embodiment. LIDAR system 100 essentially corresponds to the LIDAR system from FIG. 1. In contrast thereto, however, LIDAR system 100 is realized as a biaxial system in which receiving device 108 receives on an optical axis that is laterally offset with respect to transmission device 106. Receiving device 108 includes a detector 200 having a single receiving range 202. As a result, an angular receiving range in which reflections are able to be detected is small. If light beams 110, 122 of transmission device 106 impinge upon an object outside the angular receiving range, then the reflections are not registered because they are imaged outside receiving range 202. This restriction applies to close objects 300, in particular.

Because of the example embodiment of the present invention, even close objects 300 are detectable with the aid of a biaxial system. Since emitted light beams 110, 122 diverge, light beams 110, 122 illuminate different distance ranges of the angular receiving range. Thus, reflection 302 of light beam 122 falls on detector 200 and is registered.

The emitted lines may be situated in such a way that a compensation of the parallax effect occurs. Moreover, it is also possible to use the transmission of multiple laser lines in order to compensate for the parallax effect of a biaxial LIDAR system 100. Because of the parallax effect, reflections of objects 300 that are located in the vicinity of a biaxially imaging LIDAR system fall laterally past detector 200. These objects 300 are therefore unable to be detected.

Because of the emission of a plurality of closely adjacent lines, this is avoidable in that these lines are emitted in such a way that detector 200 evaluates a plurality of lines as a function of the object distance. In other words, detector 200 detects reflections of the first line immediately after a pulse has been emitted and it detects the reflections of the second line after a certain period of time. The separation of the two objects may ultimately be realized through the time information or the distance information.

In conclusion, it should be pointed out that terms like "having", "including" etc. do not exclude any other elements or steps and terms such as "one" or "a" do not exclude a plurality. Reference numerals in the claims should not be considered as limiting.

What is claimed is:

1. A method for detecting an object using a LIDAR system, having a rotor, a transmitting device and a receiving device, the method comprising:

transmitting, in a step of transmitting, a first light beam scanning in a scanning direction in an emission direction at a first transmission instant;

allocating, in a step of allocating, a first propagation time between the first transmission instant and a first receiving instant of a first reflection of the first light beam to the emission direction, which is a direction to the object;

transmitting, in the step of transmitting, a further light beam scanning in the scanning direction and angularly offset from the first light beam in the emission direction at a second transmission instant following the first transmission instant;

allocating, in the step of allocating, a second propagation time between the second transmission instant and a second receiving instant of a second reflection of the second light beam to the emission direction; and evaluating, in a step of evaluating, hits using the first and second propagation times allocated to the emission direction;

wherein the transmission device performs the transmitting, and the transmission device and the receiving device are on the rotor, wherein the rotor rotates about a rotation axis at an angular velocity, wherein in each angular position of the rotor, the transmission device transmits a multitude of light beams, which are divergent by an angle of divergence into a multitude of angles, wherein the angle of divergence is such that the light beams impinge upon the object in quick succession, so that a relative movement between the object and the LIDAR system results in small changes in the propagation times, so that the object is thus detected in a quasi-static manner, and wherein an average value is formed across the propagation times to detect outliers of the hits, wherein the average value improves a detection reliability of the object.

2. The method as recited in claim 1, wherein the steps of transmitting and allocating are repeated for additional emission directions at additional transmission instants.

3. The method as recited in claim 1, wherein, in a step of receiving, the first and second reflections are received in the receiving device which is situated laterally next to the transmission device of the LIDAR system.

4. The method as recited in claim 1, wherein, in a step of receiving, the first reflection is received in a first receiving range of a receiving device allocated to the first light beam, and the second reflection is received in a second receiving range of the receiving device allocated to the second light beam, the first receiving range and the second receiving range having a lateral offset in the scanning direction.

5. The method as recited in claim 1, wherein, in the step of transmitting, the first and further light beams are transmitted at an angular offset from one another of between zero degrees and five degrees.

6. The method as recited in claim 1, wherein, in the step of transmitting, the first and further light beams are transmitted with different intensities.

7. The method as recited in claim 1, wherein laser beams are transmitted as the first and further light beams in the step of transmitting.

8. The method as recited in claim 1, wherein, in the step of transmitting, the first and further light beams are transmitted in fanned out form across an angular range that is aligned transversely to the scanning direction, and in a step of receiving, the first and second reflections are received in an angle-resolved manner across the angular range.

9. An apparatus for detecting an object, comprising:
a LIDAR system, having a rotor, a transmitting device and a receiving device, configured to perform the following:
transmitting a first light beam scanning in a scanning direction in an emission direction at a first transmission instant;
allocating a first propagation time between the first transmission instant and a first receiving instant of a first reflection of the first light beam to the emission direction, which is a direction to the object;
transmitting a further light beam scanning in the scanning direction and angularly offset from the first light beam, in the emission direction at a second transmission instant following the first transmission instant;
allocating a second propagation time between the second transmission instant and a second receiving instant of a second reflection of the second light beam, to the emission direction; and
evaluating hits using the first and second propagation times allocated to the emission direction;
wherein the transmission device performs the transmitting, and the transmission device and the receiving device are on the rotor,
wherein the rotor rotates about a rotation axis at an angular velocity,
wherein in each angular position of the rotor, the transmission device transmits a multitude of light beams, which are divergent by an angle of divergence into a multitude of angles,
wherein the angle of divergence is such that the light beams impinge upon the object in quick succession, so that a relative movement between the object and the LIDAR system results in small changes in the propagation times, so that the object is thus detected in a quasi-static manner, and
wherein an average value is formed across the propagation times to detect outliers of the hits, wherein the average value improves a detection reliability of the object.

10. A LIDAR system, having a rotor, a transmitting device and a receiving device, comprising:
a device configured for detecting an object, by performing the following:
transmitting a first light beam scanning in a scanning direction in an emission direction at a first transmission instant;
allocating a first propagation time between the first transmission instant and a first receiving instant of a first reflection of the first light beam to the emission direction, which is a direction to the object;
transmitting a further light beam scanning in the scanning direction and angularly offset from the first light beam, in the emission direction at a second transmission instant following the first transmission instant;
allocating a second propagation time between the second transmission instant and a second receiving instant of a second reflection of the second light beam, to the emission direction; and
evaluating hits using the first and second propagation times allocated to the emission direction;
wherein the transmission device performs the transmitting, and the transmission device and the receiving device are on the rotor,
wherein the rotor rotates about a rotation axis at an angular velocity,
wherein in each angular position of the rotor, the transmission device transmits a multitude of light beams, which are divergent by an angle of divergence into a multitude of angles,
wherein the angle of divergence is such that the light beams impinge upon the object in quick succession, so that a relative movement between the object and the LIDAR system results in small changes in the propagation times, so that the object is thus detected in a quasi-static manner, and
wherein an average value is formed across the propagation times to detect outliers of the hits, wherein the average value improves a detection reliability of the object.

11. The system as recited in claim 10, wherein the angle of divergence is between one and three degrees.

12. The method as recited in claim 1, wherein the angle of divergence is between one and three degrees.

13. The apparatus as recited in claim 9, wherein the angle of divergence is between one and three degrees.

* * * * *